(12) United States Patent
Alesiani et al.

(10) Patent No.: US 10,802,494 B2
(45) Date of Patent: Oct. 13, 2020

(54) METHOD FOR MOTION PLANNING FOR AUTONOMOUS MOVING OBJECTS

(71) Applicant: NEC Laboratories Europe GmbH, Heidelberg (DE)

(72) Inventors: Francesco Alesiani, Heidelberg (DE); Chairit Wuthishuwong, Wuppertal (DE)

(73) Assignee: NEC CORPORATION, Tokyo (JP)

( * ) Notice: Subject to any disclaimer, the term of this patent is extended or adjusted under 35 U.S.C. 154(b) by 179 days.

(21) Appl. No.: 16/080,020

(22) PCT Filed: Feb. 16, 2017

(86) PCT No.: PCT/EP2017/053557
§ 371 (c)(1),
(2) Date: Aug. 27, 2018

(87) PCT Pub. No.: WO2017/144350
PCT Pub. Date: Aug. 31, 2017

(65) Prior Publication Data
US 2019/0056743 A1    Feb. 21, 2019

(30) Foreign Application Priority Data
Feb. 25, 2016  (EP) ..................................... 16157468

(51) Int. Cl.
*G01C 21/00*   (2006.01)
*G05D 1/02*    (2020.01)
*G05D 1/00*    (2006.01)

(52) U.S. Cl.
CPC ......... *G05D 1/0217* (2013.01); *G01C 21/005* (2013.01); *G05D 1/0223* (2013.01);
(Continued)

(58) Field of Classification Search
CPC .. G01C 21/005; G05D 1/0088; G05D 1/0217; G05D 1/0223; G05D 1/0274; G05D 2201/0213
See application file for complete search history.

(56) References Cited

U.S. PATENT DOCUMENTS 4,888,707 A * 12/1989 Shimada ................. B25J 9/1666
                                                     700/255
5,502,638 A *  3/1996 Takenaka ............. G05D 1/0212
                                                     701/301
(Continued)

FOREIGN PATENT DOCUMENTS

EP    0556031 A2   8/1993
GB    2475197 A    5/2011

*Primary Examiner* — Tyler J Lee
(74) *Attorney, Agent, or Firm* — Leydig, Voit & Mayer, Ltd.

(57) ABSTRACT

A method for motion planning for autonomous moving objects (AMO) includes continuously computing or updating a time-dependent trajectory of an AMO to a destination by a computing device avoiding obstacles en route to the destination. The time-dependent trajectory is computed using one or more motion planning computation procedures. The method further includes performing a switching to another motion planning computation procedure when an obstacle is detected or not detected anymore. An obstacle is determined to be detected when a point on the computed trajectory lies within or touches a guard area (GA) around the obstacle. The border of the GA has a certain distance from the detected obstacle.

20 Claims, 14 Drawing Sheets

(52) U.S. Cl.
CPC ......... *G05D 1/0274* (2013.01); *G05D 1/0088* (2013.01); *G05D 2201/0213* (2013.01)

(56) References Cited

U.S. PATENT DOCUMENTS

| | | | | |
|---|---|---|---|---|
| 5,819,008 A * | 10/1998 | Asama | ................. | G05D 1/0242 |
| | | | | 700/255 |
| 6,076,030 A | 6/2000 | Rowe | | |
| 6,134,486 A | 10/2000 | Kanayama | | |
| 6,134,502 A * | 10/2000 | Sarangapani | ........ | G05D 1/0217 |
| | | | | 307/9.1 |
| 6,173,215 B1 * | 1/2001 | Sarangapani | .......... | G05D 1/024 |
| | | | | 700/255 |
| 7,873,448 B2 * | 1/2011 | Takeda | ...................... | G06T 7/20 |
| | | | | 701/26 |
| 8,239,084 B2 * | 8/2012 | Yamamoto | ............. | G05D 1/024 |
| | | | | 701/1 |
| 8,260,498 B2 | 9/2012 | Deng | | |
| 8,700,307 B1 * | 4/2014 | Zhao | ...................... | B25J 9/1666 |
| | | | | 701/301 |
| 8,930,060 B1 * | 1/2015 | Lu | ......................... | B60K 28/14 |
| | | | | 701/25 |
| 9,192,869 B2 * | 11/2015 | Moriya | ................. | A63H 17/00 |
| 9,547,969 B2 * | 1/2017 | Beggs | ..................... | G08B 5/36 |
| 2006/0293856 A1 * | 12/2006 | Foessel | ................ | G01S 13/931 |
| | | | | 701/301 |
| 2007/0288133 A1 | 12/2007 | Nishira et al. | | |
| 2009/0043440 A1 * | 2/2009 | Matsukawa | .......... | G05D 1/0214 |
| | | | | 701/25 |
| 2009/0174591 A1 * | 7/2009 | Cornic | ................... | G01S 13/44 |
| | | | | 342/29 |
| 2010/0235033 A1 | 9/2010 | Yamamoto | | |
| 2011/0093134 A1 * | 4/2011 | Emanuel | .............. | G05D 1/0297 |
| | | | | 701/2 |
| 2011/0172818 A1 * | 7/2011 | Kim | ....................... | B25J 9/1666 |
| | | | | 700/246 |
| 2011/0231016 A1 * | 9/2011 | Goulding | ................ | G01C 21/20 |
| | | | | 700/246 |
| 2011/0288774 A1 * | 11/2011 | Bengtsson | ............. | G08G 1/165 |
| | | | | 701/301 |
| 2013/0231855 A1 * | 9/2013 | Mcaree | ................... | E02F 9/24 |
| | | | | 701/301 |
| 2014/0251123 A1 * | 9/2014 | Venema | ................. | F41H 11/02 |
| | | | | 89/41.22 |
| 2015/0081200 A1 * | 3/2015 | Wang | ................. | G01C 21/00 |
| | | | | 701/301 |
| 2017/0103659 A1 * | 4/2017 | Jin | ........................... | G01S 1/68 |

* cited by examiner

METHOD FOR MOTION PLANNING FOR AUTONOMOUS MOVING OBJECTS

CROSS REFERENCE TO RELATED APPLICATIONS

This application is a U.S. National Phase application under 35 U.S.C. § 371 of International Application No. PCT/EP2017/053557, filed on Feb. 16, 2017, and claims benefit to European Patent Application No. EP 16157468.6, filed Feb. 25, 2016. The international application was published in English on Aug. 21, 2017, as WO 2017/144350 A1 under PCT Article 21(2).

FIELD

The present invention relates to a method for motion planning for autonomous moving objects, 'AMO' like robots, cars or the like, wherein continuously a time-dependent trajectory of an AMO to a destination is computed or updated by a computing device avoiding obstacles en route to said destination.

The present invention further relates to a motion planning device for motion planning for autonomous moving object, 'AMO' like robots, cars or the like, said device being adapted to continuously compute or update a time-dependent trajectory of an AMO to a destination avoiding obstacles en route to said destination.

The present invention further relates to a non-transitory computer readable medium storing a program causing a computer to execute a method for motion planning of autonomous moving objects, 'AMO' like robots, cars or the like, wherein continuously a time-dependent trajectory of an AMO to said destination is computed or updated avoiding obstacles en route to a destination.

Although applicable to any kind of moving objects, the present invention will be described with regard to vehicles in particular in form of robots and cars.

BACKGROUND

Motion planning serves as the ground technology for any autonomous vehicle like robots. It basically determines the safe position from a current location to the desired destination. Many motion planning techniques have been designed depending on the objective of robot applications ranging from a grounded vehicle, underwater robot, and drone to a walking robot.

One of the scenarios where an autonomous vehicle needs to face is the highway and interurban scenario, where the vehicle needs to drive and to merge into heterogeneous traffic meeting safety, efficiency and comfort criteria.

Conventional methods can only deal properly with simple scenarios, where only few vehicles are involved. A more complete method needs to be able to deal with complex obstacle conditions and time dependent obstacles, a time dependent obstacle being an obstacle, which moves over time.

Avoiding obstacles and moving to a destination are the main objectives of motion planning for autonomous vehicles. However, the problem is, when and at what level to start avoiding the obstacle in order to provide a continuous smooth motion for the vehicle while at the same time keeping moving to the destination with minimal travel distance. There is a plenty of conventional techniques addressing this particular problem but one of their drawbacks is that they are computational expensive and have only reduced smoothness.

Conventional methods provide a somewhat optimal trajectory by dealing the obstacle in a pre-processing step and by assigning the obstacle a virtual point of one side of a vehicle, independent of the actual trajectory and using interpolating function, as spline function, to smooth the trajectory a post processing step. This step can improve the smoothness but introduce artifacts.

Other conventional methods address motion planning by defining a global optimization problem and finding the optimal solution, i.e. a trajectory. These conventional methods generate smooth solutions, but are limited by the number of obstacles and in case of high dynamic environment require frequent re-computation of the solution.

Sample-based conventional methods like RRT—rapid exploration random tree—are flexible and can deal with complex scenarios, but do not provide smooth trajectories. Smoothness is obtained with an additional post-processing phase at the drawback of additional computational cost.

Other conventional methods developed in the context of robot motion are focusing on low speed solution, as for example "Wall Following" or "Bug navigation". These conventional methods find an only sub-optimal solution with limited computational cost and in bounded time.

Conventional motion planning robots and systems are for example disclosed in the non-patent literature of Egerstedt, M., 2000. Behavior based robotics using hybrid automata. In Hybrid Systems: computation and control (pp. 103-116). Springer Berlin Heidelberg or in the non-patent literature of Rickert, M., Sieverling, A. and Brock, O., 2014. Balancing exploration and exploitation in sampling-based motion planning. *Robotics, IEEE Transactions on,* 30(6), pp. 1305-1317. Further, U.S. Pat. No. 8,260,498 B2 shows a decomposition and control architecture for complex vehicle control systems.

Other conventional methods are for example disclosed in the non-patent literatures of Karaman, S. and Frazzoli, E., 2011. Sampling-based algorithms for optimal motion planning. *The International Journal of Robotics Research,* 30(7), pp. 846-894, Karaman, S., Walter, M. R., Perez, A., Frazzoli, E. and Teller, S., 2011, May. Anytime motion planning using the RRT*. In *Robotics and Automation (ICRA),* 2011 *IEEE International Conference on* (pp. 1478-1483). IEEE, Johansson, K. H., Egerstedt, M., Lygeros, J. and Sastry, S., 1999. On the regularization of Zeno hybrid automata. Systems & Control Letters, 38(3), pp. 141-150, Galceran, E., Eustice, R. M. and Olson, E., 2015. Toward Integrated Motion Planning and Control using Potential Fields and Torque-based Steering Actuation for Autonomous Driving.

Even further in U.S. Pat. No. 6,076,030 A, a learning system and method for optimizing control of autonomous earthmoving machinery is disclosed and in U.S. Pat. No. 6,134,486 A, a robot and method of control for an autonomous vehicle to track a path consisting of directed straight lines and circles with positional feedback and continuous curvature is shown.

SUMMARY

In an embodiment, the present invention provides a method for motion planning for autonomous moving objects (AMO). The method includes continuously computing or updating a time-dependent trajectory of an AMO to a destination by a computing device avoiding obstacles en route to the destination. The time-dependent trajectory is computed using one or more motion planning computation procedures. The method further includes performing a switching to another motion planning computation procedure when an obstacle is detected or not detected anymore. An obstacle is determined to be detected when a point on the computed trajectory lies within or touches a guard area (GA) around the obstacle. The border of the GA has a certain distance from the detected obstacle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
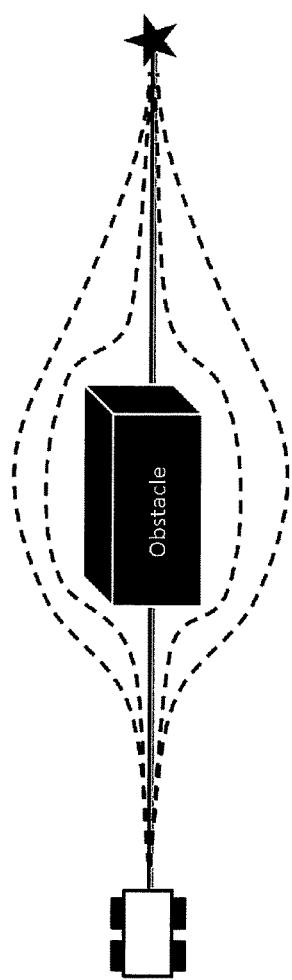
FIG. 1 shows schematically a scenario for an AMO and an obstacle.

At least one embodiment of the present invention provides an efficient integration of a smooth motion of an autonomous vehicle. At least one embodiment of the present invention provides safe motion planning with approximated optical route choice with reduced required computational resources.

In an embodiment the present invention provides a method for motion planning for autonomous moving objects, AMO' like robots, cars or the like, wherein continuously a time-dependent trajectory of an AMO to a destination is computed or updated by a computing device avoiding obstacles en route to a destination, and wherein said time-dependent trajectory being computed using one or more motion planning computation procedures, wherein a switching to another motion planning computation procedure is performed when an obstacle is detected or not detected anymore, wherein an obstacle is determined to be detected when a point on said computed trajectory lies within or touches a certain area, the guard area, 'GA', around the obstacle, the border of said area having a certain distance from said detected obstacle.

In a further embodiment the present invention provides a motion planning device for motion planning for autonomous moving objects, AMO' like robots, cars or the like, said device being adapted to continuously compute or update a time-dependent trajectory of an AMO to a destination avoiding obstacles en route to a destination, and wherein said time-dependent trajectory being computed using one or more motion planning computation procedures, wherein a switching to another motion planning computation procedure is performed when an obstacle is detected or not detected anymore, wherein an obstacle is determined to be detected when a point on said computed trajectory lies within or touches a certain area, the guard area, 'GA', around the obstacle, the border of said area having a certain distance from said detected obstacle.

In a further embodiment the present invention provides a non-transitory computer readable medium storing a program causing a computer to execute a method for motion planning for autonomous moving objects, AMO' like robots, cars or the like, wherein continuously a time-dependent trajectory of an AMO to a destination is computed avoiding obstacles en route to a destination, and wherein said time-dependent trajectory being computed using one or more motion planning computation procedures, wherein a switching to another motion planning computation procedure is performed when an obstacle is detected or not detected anymore, wherein an obstacle is determined to be detected when a point on said computed trajectory lies within or touches a certain area, the guard area, 'GA', around the obstacle, the border of said area having a certain distance from said detected obstacle.

Embodiments of the present invention may provide a faster computing speed. Based on the computation efficient result, e.g. as shown in the non-patent literature of Rickert, M., Sieverling, A. and Brock, O., 2014. Balancing exploration and exploitation in sampling-based motion planning. Robotics, IEEE Transactions on, 30(6), pp. 1305-1317, the exploitation strategy (2 concerned methods, Potential Fields and Direct line of Sight) in motion planning is faster and consume less memory than exploration strategy that heavily use in Rapid exploring Random Tree (RRT) algorithm and its family like RRT* and RRT-connect.

At least one embodiment of the present invention enables adaptive exploration and exploitation. At least one embodiment of the present invention may have an advantage of faster computation than traditional Exploration (RRT) methods and not trapping in the local minima problem which could happen in exploitation, e.g. when using potential fields.

Further, at least one embodiment of the present invention may enable smoothness of the vehicle motion. Sliding motion on the Guard surface for instance compromises the Tracking Goal vector with the Avoid Obstacle vector before projecting on a tangent space. Therefore, the oscillation of switching between those two components will be significantly reduced; computational resources as well as e.g. vehicle resources are saved due to the smoothness of the vehicle motion avoiding or at least reducing abrupt changes in speed and heading. Thus passenger comfort of passengers in a vehicle is increased.

The terms "computing entity", "computing device" or the like refer in particular in the claims, preferably in the specification each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity/device may be identical forming a single computing device. The device(s)/entity(ies) may also be instantiated as a virtual device running on a physical computing resource. Different devices/entities may therefore be executed on said physical computing resource.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The term "computational resource" is to be understood in its broadest sense and refers in particular in the claims, preferably in the specification to any kind of physical and/or virtual computational or compute resource, resource, device, entity or the like adapted to perform computing and which can be used by applications, services, users, etc. to perform certain functions, services, applications or the like. A computational resource may include but is not limited to computes, networks, memories, storages, etc. For instance a compute resource may be a CPU resource that is part of the servers inside the datacenter. Thus a server can have Compute like CPU (or vCPU), Network like Network Interface card (NIC), Memory like RAM and/or Storage like external/internal HDD(s).

The term "function" refers in particular in the claims, preferably in the specification to any kind of atomic, mathematical, higher level, or virtual function which can be performed by a computing entity. For example an atomic function may be to shift values within a memory of a computing entity. An example for a virtualized function may be any kind of combination of functions of different entities. For example a mathematical function is the addition or multiplication of two values. For instance an example for a higher level function is a function to collect network topology information.

The term "obstacle" is to be understood in his broadest sense and refers preferably in the claims, in particular in the specification, to any kind of object which might be able to cross the trajectory, path or the like of another object and is detectable by sensors and/or its position is knowable or positional information is obtainable.

The term "motion planning" is to be understood in its broadest sense and refers in particular in the claims, preferably in the specification to any kind of method, procedure, algorithm or the like enabling computing or generating a trajectory, way, path or the like from a start position to an end position/destination. Such a computation will be performed by a computing device or entity and may be bound by certain restrictions, boundaries or the like in particular in form of physical parameters like acceleration range, yaw rate or the like.

The term "autonomous moving object" is to be understood in its broadest sense and refers in particular in the claims, preferably in the specification to moving objects like robots, cars, vehicles, unmanned, uninhabited or unpiloted land, sea or areal vehicles, which can move without the need of a human pilot, driver or operator. Such a vehicle may be for example under full or intermittently control and may move autonomously for instance by an onboard computing device or the like.

The term "continuously" with regard to computing or updating a trajectory is to be understood in its broadest sense and refers in particular in the claims, preferably in the specification to a repeated computing in a regular manner, for example periodically, upon request or the like such that in general a steady movement along the trajectory may be provided.

The term "time-dependent" with regard to "trajectory" is to be understood in its broadest sense and refers in particular in the claims, preferably in the specification to information of a vehicle being in different positions or locations at certain time points, wherein a trajectory includes a plurality of such information and is/can be amended during time, for instance for obstacle avoidance.

The term "area" is to be understood in its broadest sense and refers in particular in the claims, preferably in the specification to any kind of n-dimensional surface, with $n \geq 1$, for example a point, an area, a volume, etc. An area may represent at least one of x-, y-, z-position, direction, speed, etc.

The term "guard area" is to be understood in its broadest sense and refers preferably in the claims, in particular in the specification, to an area, preferably wherein an object, which may be of any kind, lies within or at least touches said area. Said area may have the form of a ring with an obstacle being the center of the ring but not being part of said area itself. Said area may also be an arbitrary strip with a defined length and width in space and only relevant or present for certain time periods. Said area may also be provided by a distance between two 3-dimensional spheres both having the same obstacle in their center.

The term "obstacle avoidance" with regard to the term "motion planning computation procedure" which may be also called "Exploration" refers in particular in the claims, preferably in the specification to a procedure to avoid an obstacle based on expanding a tree to find feasible paths, thus exploring new free space.

The term "tracking goal" with regard to "motion planning computation procedure", which may be also called "Exploitation in free space", refers in particular in the claims, preferably in the specification to a method aiming to reach a destination as quick as possible. The method may use a potential function and/or a direct line of sight movement.

The term "sliding motion" with regard to "motion planning computation procedure", which may be also called "Exploitation in the presence of obstacle" refers in particular in the claims, preferably in the specification to a procedure enabling a high degree of smoothness of the vehicle motion in the presence of an obstacle.

The term "threat" refers in particular in the claims, preferably in the specification to a situation, scenario, arrangement or the like for an AMO being represented by one or more parameters for physical values or variables fulfilling one or more boundaries, thresholds, value ranges or the like.

Further features, advantages and further embodiments are described or may become apparent in the following:

Said motion planning computation procedures may be based on the principle of a) obstacle avoidance, b) tracking goal and/or c) sliding motion. This enables in a flexible way for different scenarios to provide an efficient method for motion planning.

When a) no obstacle is detected and/or b) no threat for said AMO and/or said obstacle is detected, said trajectory may be computed using tracking goal. When a computed trajectory at least touching said GA and a threat being detected, said trajectory may be computed using sliding motion and when the actual position of said AMO is closer to the obstacle than a minimum distance between said GA and said obstacle, said trajectory may be computed using obstacle avoidance. This enables in a reliable way that computational methods are chosen being the most suitable for a situation enabling a smooth and efficient computation of a trajectory.

Said GA may be defined by a function based on the distance to a detected obstacle and associated with a yaw rate of said AMO. This enables in an easy and efficiently computing way to define a GA.

Said trajectory computed using sliding motion may enter, lie within and exit said GA. This ensures that the obstacle is efficiently avoided without neglecting smoothness of the trajectory.

A plurality of GA may be defined, at least two of said GA may be associated with different computational boundaries defined by physical parameters to be respected when computing a trajectory. This enables to implement a complex behaviour as for example in one of the guard areas the yaw rate is minimized, in another guard area the speed is kept at the maximum value and in another guard area acceleration variations are minimized.

The size of GA may be selected such that a certain smoothness of said trajectory is provided when computing said trajectory. This enhances flexibility in terms of smoothness relevance.

The GA may be having the shape of a sphere, ellipsoid and/or a hyper polygon. This enables in a flexible way to define a GA respecting also provided or available computational resources.

Said device may be adapted to convert said computed trajectory into steering information and speed information for an AMO. This enables a device to provide the necessary information for an AMO for autonomous driving ensuring obstacle avoidance.

Said device may be connected to one or more sensors of said AMO for obstacle detection, position and orientation determination. This enables a trajectory computation in an easy and efficient way to directly receive information about obstacles being detected and the position and orientation of the AMO as well as the position of the detected obstacle.

Said device may be connected to a database providing map information like road geometry or the like. This enables to take into account only allowable roads for example along a road network, thus enabling AMO's in form of cars.

The method may be performed using single-path exploration and/or using sample-based exploration with an underlying exploration tree. This enables for example fast but reliable exploitation with an optimum of computational resources.

FIG. 1 shows schematically a scenario for an AMO and an obstacle. In a FIG. 1 a scenario of an AMO is shown which has a plurality of paths to avoid the obstacle starting from its position and travelling to a destination, i.e. a collision free path between the start and end points has to be found.

Figure 2:
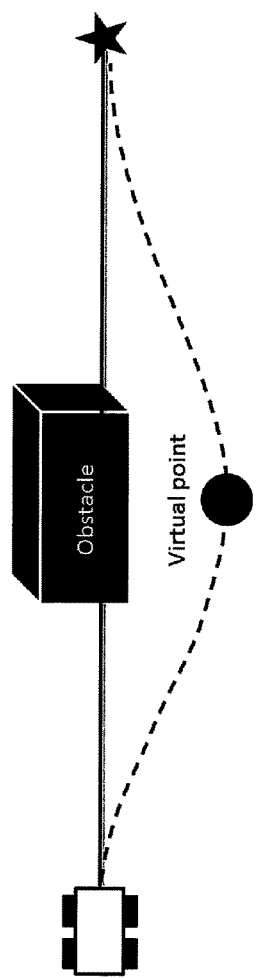
FIG. 2 shows schematically a conventional scenario for avoiding an obstacle.

FIG. 2 shows schematically a conventional scenario for avoiding an obstacle. In FIG. 2 a sample of a conventional solution to an obstacle avoidance problem is shown: A virtual point besides the obstacle location is added such that the vehicle travels along a trajectory which is smooth from the start point of the AMO via the virtual point to the destination.

Figure 3:
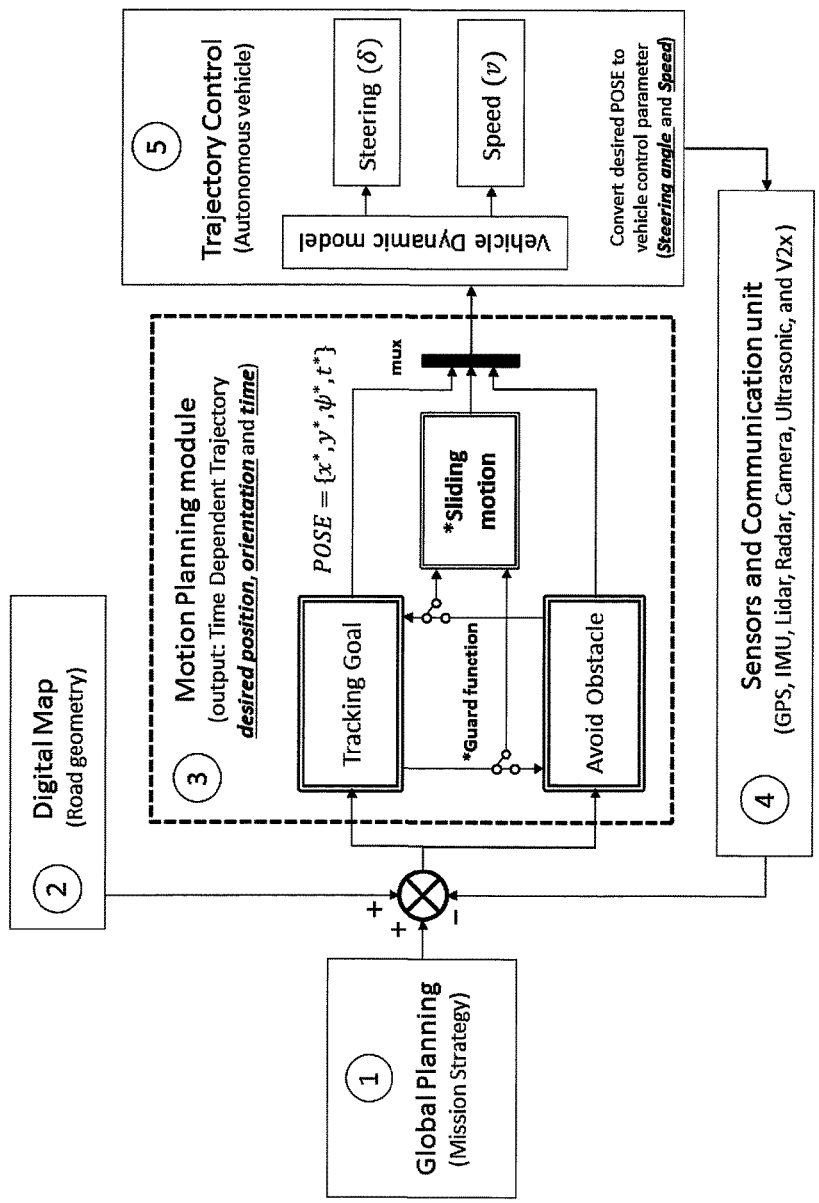
FIG. 3 shows a system with a device according to an embodiment of the present invention.

FIG. 3 shows a system with a device according to an embodiment of the present invention. In FIG. 3 a system architecture including an embodiment of the present invention is shown: The system architecture according to an embodiment of the present invention for motion planning can be represented as the closed loop control block diagram as shown in FIG. 3. The system comprises five components:

The first component is the Global planning (mission strategy). It is the high level objective for making a decision of the overall trip plan such as the final destination, where a vehicle has to go. This global planning can be provided by human input or by Artificial Intelligence i.e., centralized controller or cloud server processing.

The second component is the digital map. It is the associated information, which will help an autonomous vehicle improve the quality of localization by providing the corresponding road geometry, lane information and etc.

The third component is the Motion planning, which will determine the time dependent safe and smooth trajectory (desired position, orientation and time) for an autonomous vehicle. It basically uses the information from the Global planning (1), where to go, associates with the Digital map (2) corresponding to the real location and specifies the current location of an autonomous vehicle, where it is, for instance through the feedback information from vehicle's sensors (4), then computes the intermediate trajectory with the preview time horizon (t+i), second, where, t is the current time and i is the preview time horizon how many seconds ahead, a vehicle will drive to, based on above three inputs information. For instance, planning the motion of an autonomous vehicle in 10 seconds ahead, the output will provide a vector of time dependent trajectory from t=0 to t=10 with the specified sampling period i.e., 10 Hz. or every 0.1 second. The Hybrid-automata with the Sliding motion is introduced in order to avoid an unnecessary large yaw rate and improve the smoothness of the output trajectory.

The fourth component is the feedback mechanism that measured the current vehicle status and its surrounding for localization purpose by installing sensors such as, current position and orientation from GPS and IMU and/or supporting by fusing data from additional sensors like Lidar, Radar, and Camera. Additionally, the system is capable of using the information from the communication unit like V2x in order to improve the quality of localization information i.e., GPS accuracy improvement through V2I position correctness, and support the capability of cooperative motion planning i.e., trajectory optimization, trajectory conflict resolution via V2V or Cloud controller. The environment data surrounding an autonomous vehicle, in addition, can measure by perception sensors such as, Lidar, Radar, Camera and Ultrasonic sensor. The road geometry data can be obtained from the digital map, a real time dynamic map can be built.

The fifth component is the trajectory control. This component is the actual step to drive an autonomous vehicle. It receives the time dependent trajectory from the motion planning components and converts the desired position, orientation and time to the steering angle and speed command based on the vehicle dynamic model in order to control the actual motion of an autonomous vehicle.

Processing these feedback data from (4) with the reference data given by Global planning (1) and Digital map (2), the proposed motion planning (3) determines whether planning strategy will be executed between "Tracking Goal", "Avoid Obstacle" and "Sliding Motion". The method computes the approximated optimal motion by exploring the free space and choosing the minimum route cost among all candidate routes, related to these three strategies.

The method considers three strategies:
1) Exploration or Obstacle Avoidance;
2) Exploitation in free space or Tracking Goal; and
3) Exploitation in presence of obstacle or Sliding.

Tracking Goal (Exploitation) aims to reach the destination as quick as possible. Two sub-strategies can be considered in Tracking Goal: 1) the potential function and 2) direct line of sight, which enable extremely light computation. On the other side, Avoid Obstacle (Exploration) is based on the expanding the tree to find the feasible paths, thus exploring new free space. Exploration typically requires more computation resources compared to exploitation methods.

Embodiments of the present invention use an additional—herein called hybrid—strategy: the exploitation in presence of obstacle or Sliding motion. The motion planning switches between strategies, based on the Guard area that defined by the function of distance and yaw rate constraint. In addition, for instance the constraint of minimum yaw rate in order to change the vehicle motion is be bounded by the yaw rate constraint, which is taking into account in Guard function i.e., yaw rate ($\dot{\psi} \in 5°/s$). Whenever the autonomous vehicle detects no obstacles or threats that have harmful possibility, Tracking Goal motion planning will be executed. If in contrast, sensors detect any harmful scenarios, within the Guard area, the Sliding motion planning will be switched on. In an extreme case for instance when the explored space is too close to the obstacle (out of the Guard area) then the Obstacle Avoidance motion planning will be switched on.

Therefore, this strategy is capable of handling two roles:
1) Preview motion planning, where an entire solution is generated before executing the motion.
2) Instantaneous motion planning, when there is a sudden change in the environment, the system can find a new highly dynamic solution.

The switching strategy can be employed for the high frequency update of the trajectory that consider imminent obstacles or integrated in a global planning (as for example sample based RRT=Rapid exploring Random Tree) providing a better space exploration, by reducing exploring unnecessary state space regions. With this hybrid strategy, the computation cost is significantly reduced.

Furthermore, embodiments of the present invention provide the concept of Sliding motion for the smoothness of the vehicle motion. The Guard area may be defined by a Guard function, which is based on the distance to obstacle and bounded with the yaw rate constraint, which follows the driving comfort criteria e.g., $$\dot{\psi}\left(\frac{\deg}{\sec}\right) \in [-5.5].$$

Figure 4:
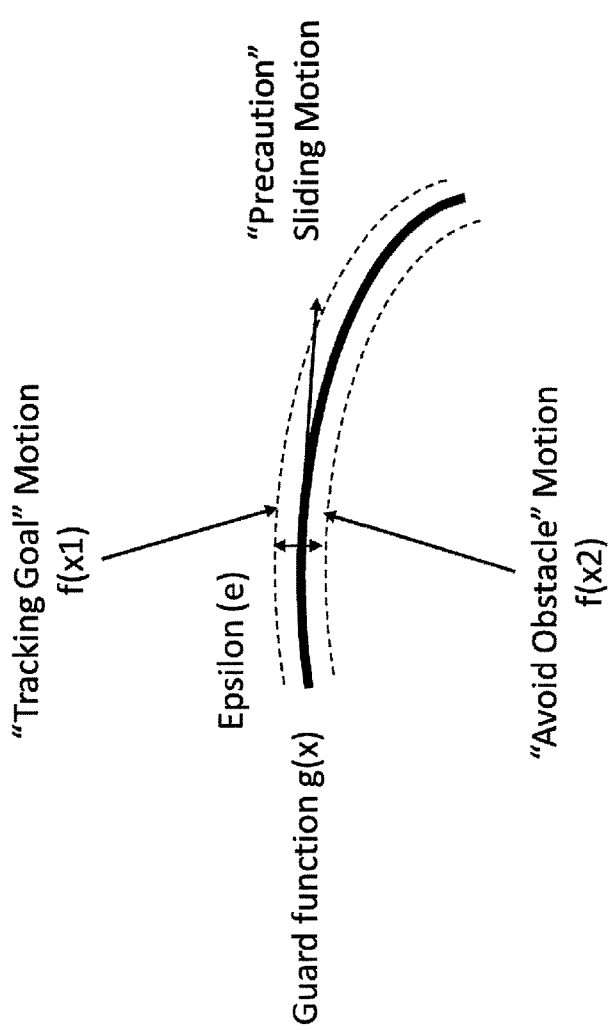
FIG. 4 shows part of steps of a method according to an embodiment of the present invention.

FIG. 4 shows part of steps of a method according to an embodiment of the present invention. In FIG. 4 an example of a guard function and a tangential vector for sliding motion is shown. The Guard area as shown in FIG. 4 includes a tolerance of epsilon as a boundary condition to protect an autonomous vehicle drive safely in this boundary and ensure the stability. An example of Guard function can be defined as:

$$G(x) = \|x - x^*\| - D$$

where x* is the position of an obstacle, x is the node position, D is the radius of the obstacle with some constant when the guard function is only defined on the distance or $$G(x) = \max(|\|x-x^*\|-D|, \max(0, \dot{\psi}_{min} - f(\theta)), \max(0, f(\theta) - \dot{\psi}_{max}))$$

where $f(\theta)$ is a function of vehicle heading and $\dot{\psi}_{min}, \dot{\psi}_{max}$ are the boundaries of the yaw rate constraint; when a range in the yaw rate is included.

The guard area on the other hand is defined as: $-\varepsilon \leq G(x) \leq \varepsilon$, where $\varepsilon$ is the tolerance of the Guard function.

The guard surface is the boundary between the Tracking Goal (Exploitation) and the Avoid Obstacle (Exploration). In other words, an autonomous vehicle will drive in the Sliding motion, which is the state between those two motion planning strategies, whenever the condition of Guard function is met.

Figure 5:
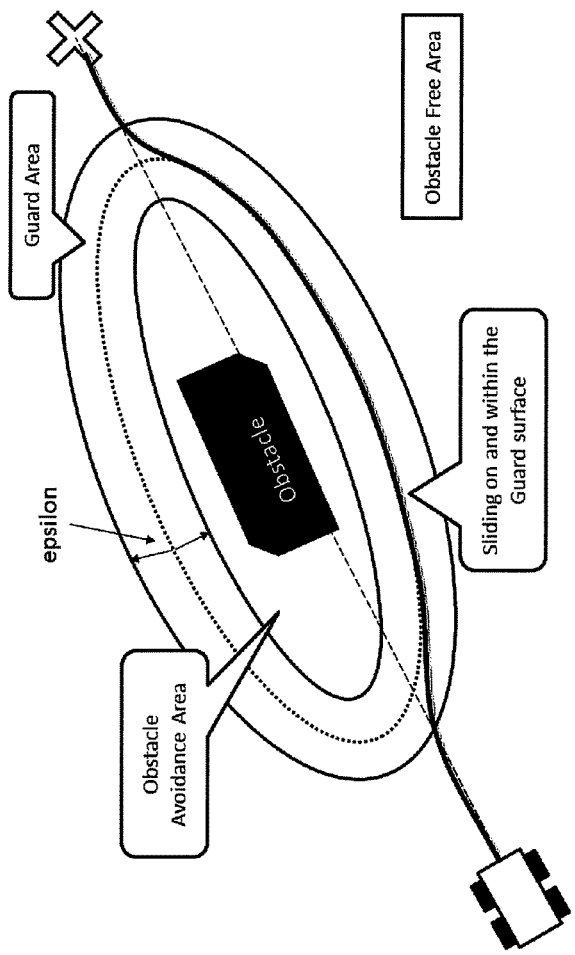
FIG. 5 shows part of steps of a method according to an embodiment of the present invention.

In detail the sliding motion is illustrated in FIG. 5. FIG. 5 shows part of steps of a method according to an embodiment of the present invention. In FIG. 5 a vehicle motion sliding on and within the guard surface is shown.

Figure 6:
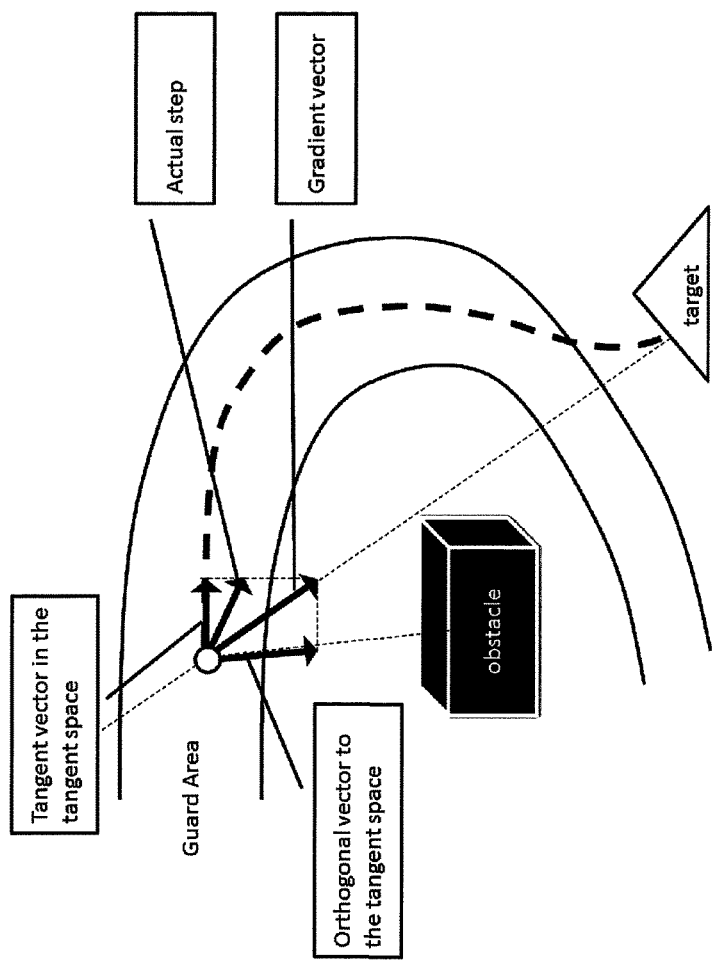
FIG. 6 shows part of steps of a method according to an embodiment of the present invention.

FIG. 6 shows part of steps of a method according to an embodiment of the present invention. In FIG. 6 a local sampling step for the gradient of an AMO vector is shown.

The shape of guard area is built considering the following:
1) A trajectory inside the Guard area needs to be smooth and the size of tolerance allows a vehicle maneuvering, so the speed of vehicle may take into account the size of tolerance.
2) The Guard area shall not be unnecessary large, in order to prevent unnecessary vehicle maneuverings.

In the Guard area, the gradient vector, the vector that points directly to the target, may be decomposed into the tangent and orthogonal component. The local sampling step is defined such that:
1) Allow to exit the Guard area when the obstacle has passed
2) Stay in the Guard area when the obstacle is still detected
3) Allow to explore/move the Guard area.

In order to meet the previous requirements, the actual step is defined by a combination of the two components; where the orthogonal component is reduced when directed towards the obstacle, inverse proportionally to the distance to the boundary of the Guard area closer to the obstacle. On the other hand, it is not reduced when points outside direction with respect to the obstacle.

Figure 7B:
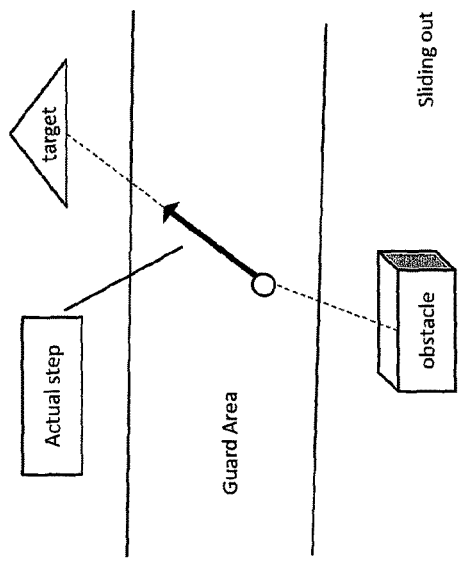
FIGS. 7a, 7b show part of steps of a method according to an embodiment of the present invention.
Figure 7A:
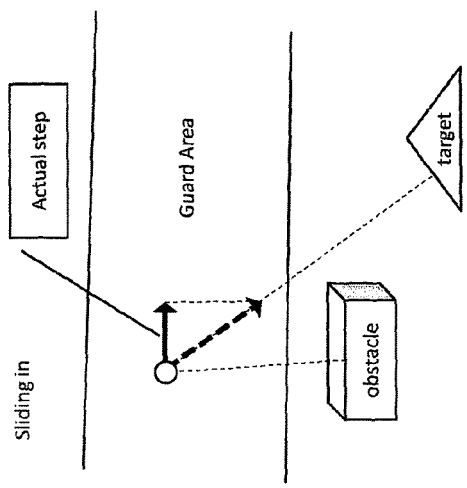

FIG. 7 shows part of steps of a method according to an embodiment of the present invention. In FIG. 7 a) sliding in and in FIG. 7 b) sliding out of a vehicle of the guard area is shown performing the local sampling step described in connection with FIG. 6.

Figure 8:
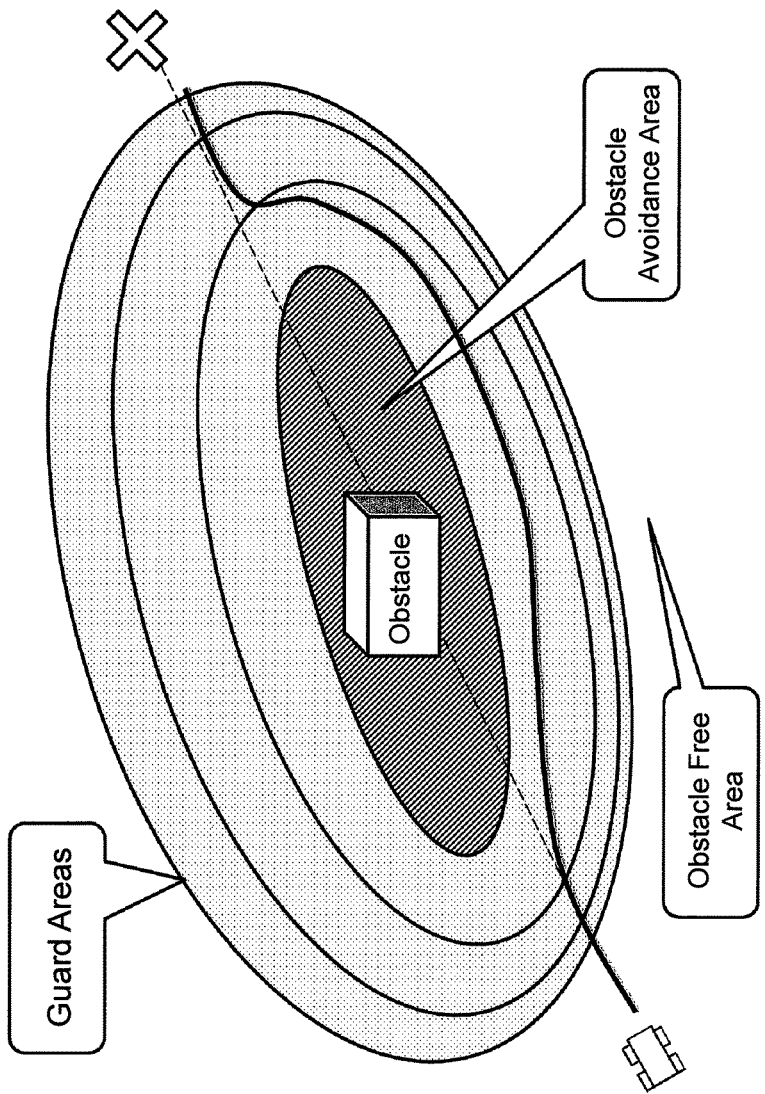
FIG. 8 shows part of steps of a method according to an embodiment of the present invention.

FIG. 8 shows part of steps of a method according to an embodiment of the present invention. In FIG. 8 a scenario with multiple guard areas or guard functions is shown. Multiple guard areas can be defined using in multiple guard functions including a definition of the transitions between each guard area. For example, in one of the guard areas the yaw rate of an AMO is minimized whereas in another guard area the speed is kept at a maximum value and in another the acceleration variations are minimized.

Figure 9:
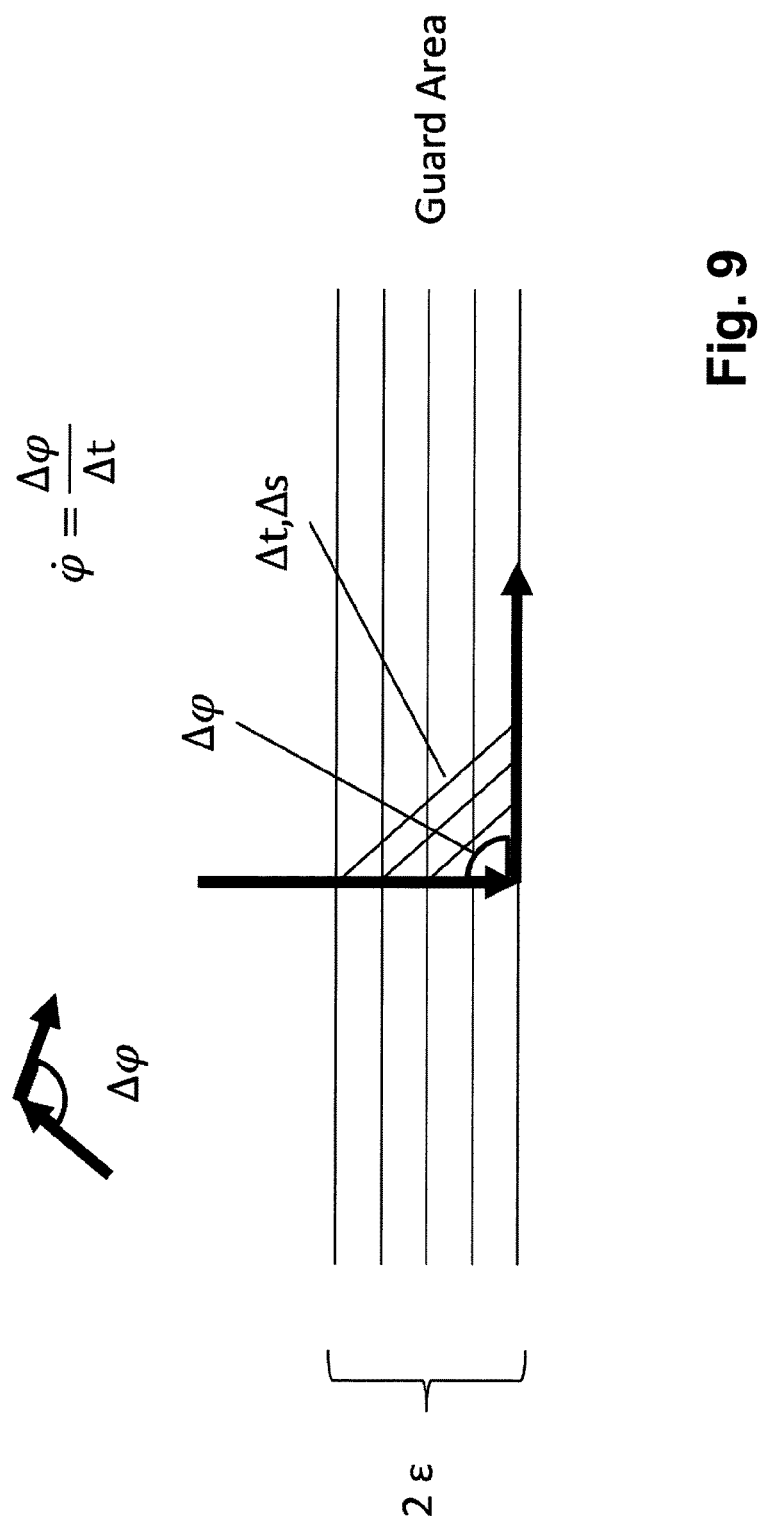
FIG. 9 shows part of steps of a method according to an embodiment of the present invention.

FIG. 9 shows part of steps of a method according to an embodiment of the present invention. In FIG. 9 an example for a smoothness guarantee scenario is shown. For instance by selecting proper bandwidth of the transition/guard area smooth transition or bound yaw rate can be guaranteed. To guarantee a bounded yaw rate the size of the guard area can be determined as follows: Let set the maximum speed ($v_{max}$) and the maximum yaw rate ($\dot{\varphi}_{max}$), then the smoothness depends on the time of change of the maximum yaw change, which is the transition from the perpendicular to the horizontal direction, $\Delta\varphi_{max}=90°$. The Guard Area thickness is given by:

$$\epsilon \geq \frac{v_{max}\Delta\varphi_{max}}{\dot{\varphi}_{max}2\sqrt{2}}$$

Figure 10:
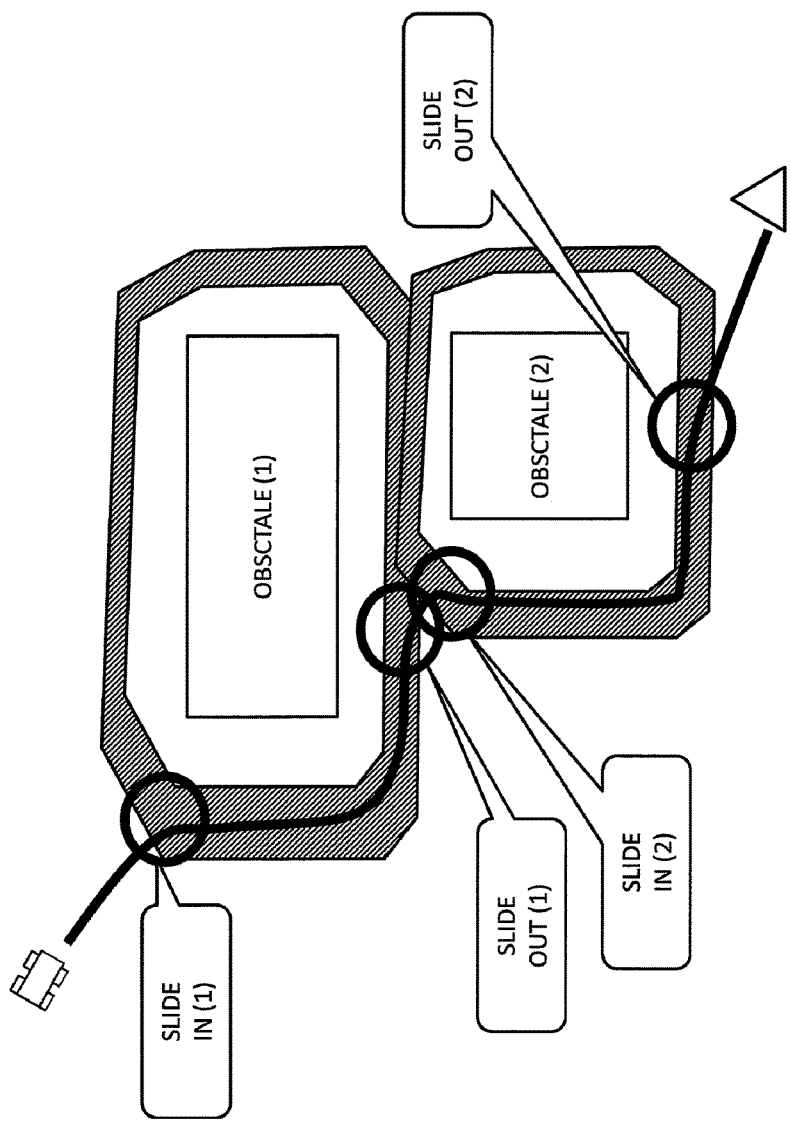
FIG. 10 shows part of steps of a method according to an embodiment of the present invention.

FIG. 10 shows part of steps of a method according to an embodiment of the present invention. In FIG. 10 an example for overlapping guard areas is shown.

Figure 11:
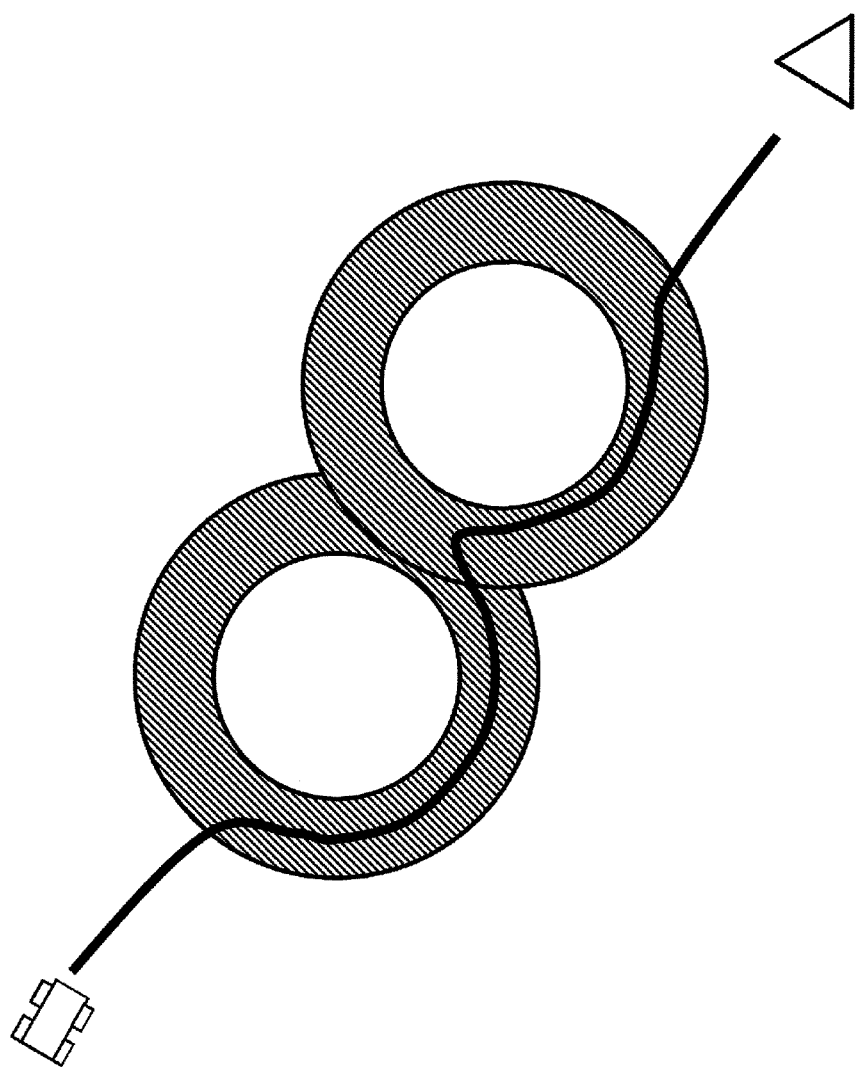
FIG. 11 shows part of steps of a method according to an embodiment of the present invention.

FIG. 11 shows part of steps of a method according to an embodiment of the present invention. In FIG. 11 a smoothness violation of a trajectory is shown. When guard areas of multiple obstacles overlap, the trajectory may need to transit from one guard area to the other. The guard functions are independent and they apply separately. The result trajectory will transit from one guard area to the other depending on which guard function is stronger. Indeed the movement vector will reduce its component toward the obstacle when approaching the "Obstacle Avoidance" area of any of the obstacle. In FIG. 10 the SLIDE OUT (1) phase may be generated by the destination or by the SLIDE IN (2) of the second obstacle. The trajectory may not more guaranteed to have smooth transition, as shown in FIG. 11. This effect can be lowered by enlarging the guard areas in the overlapping zones.

Figure 12:
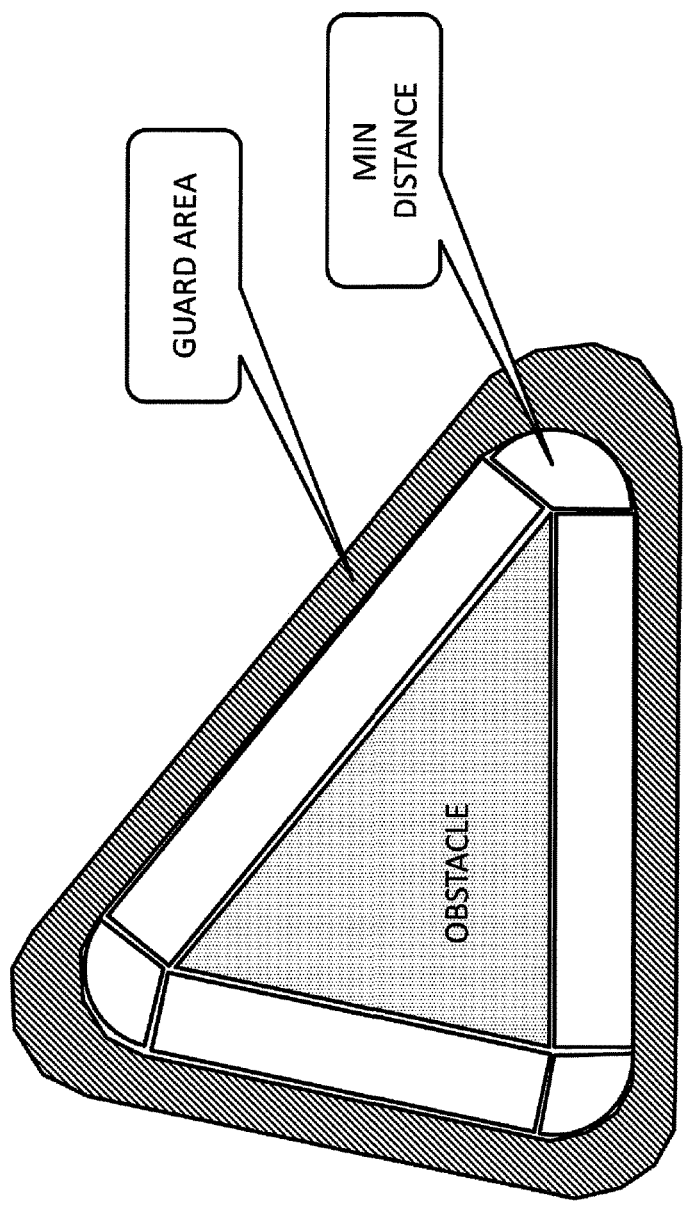
FIG. 12 shows part of steps of a method according to an embodiment of the present invention.

FIG. 12 shows part of steps of a method according to an embodiment of the present invention. When the obstacle can not modelled as a point or bounded by a sphere or ellipsoid it can be described by a more general geometrical shape as a (hyper) polygon and the guard area can still generate a smooth guard area. In the case of polygon, for example, the guard function could be defined by the minimal distance between any edge of the polygon. In this case the yaw rate is proportional to the max speed and the distance:

$$\dot{\varphi}_{max} = \frac{v_{max}}{D}$$

The distance of the guard area then is dependent to the maximal speed and the maximal yaw rate:

$$D = \frac{v_{max}}{\dot{\varphi}_{max}}$$

Figure 13A:
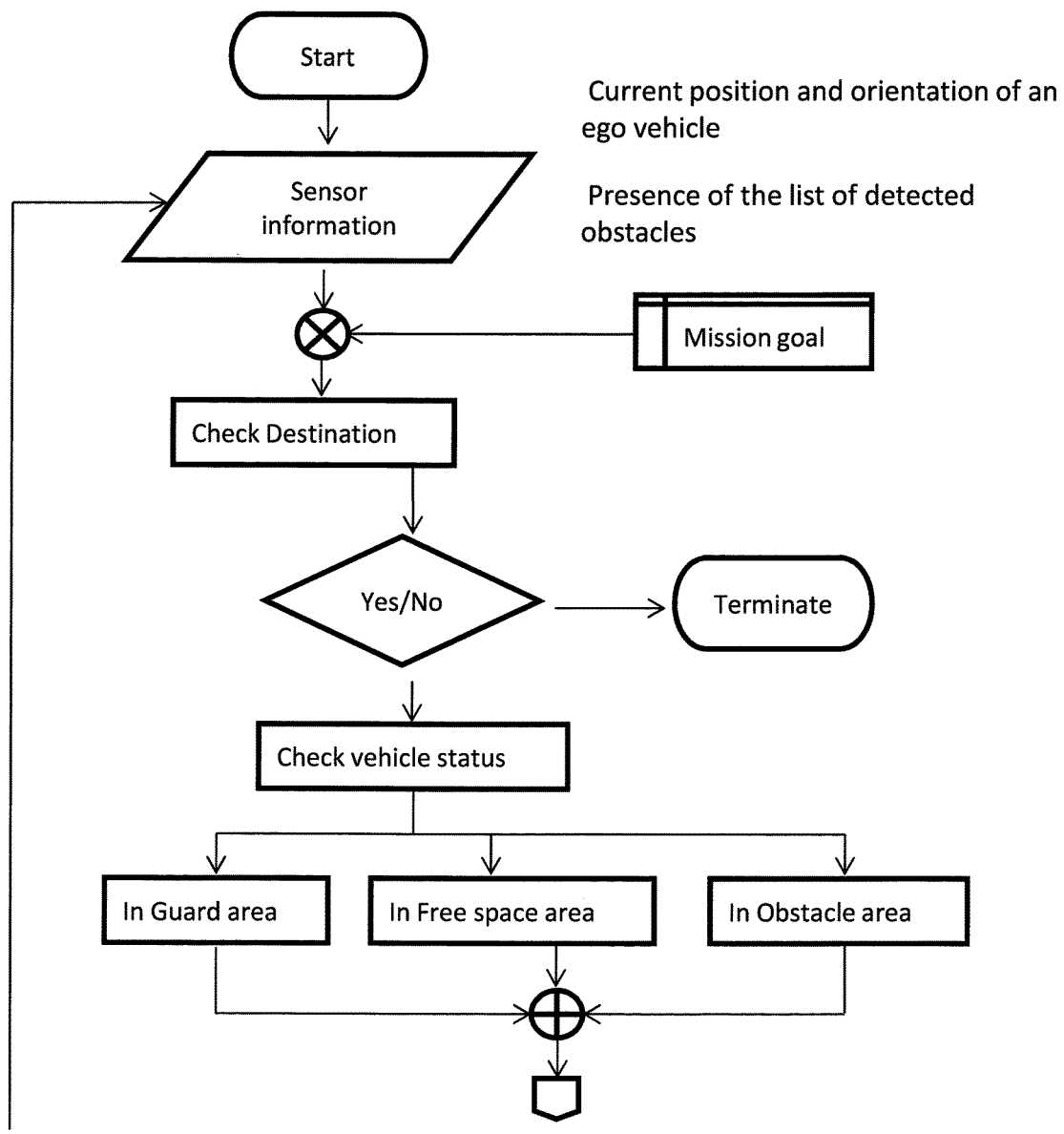
FIGS. 13a, 13b show part of steps of a method according to an embodiment of the present invention.
Figure 13B:
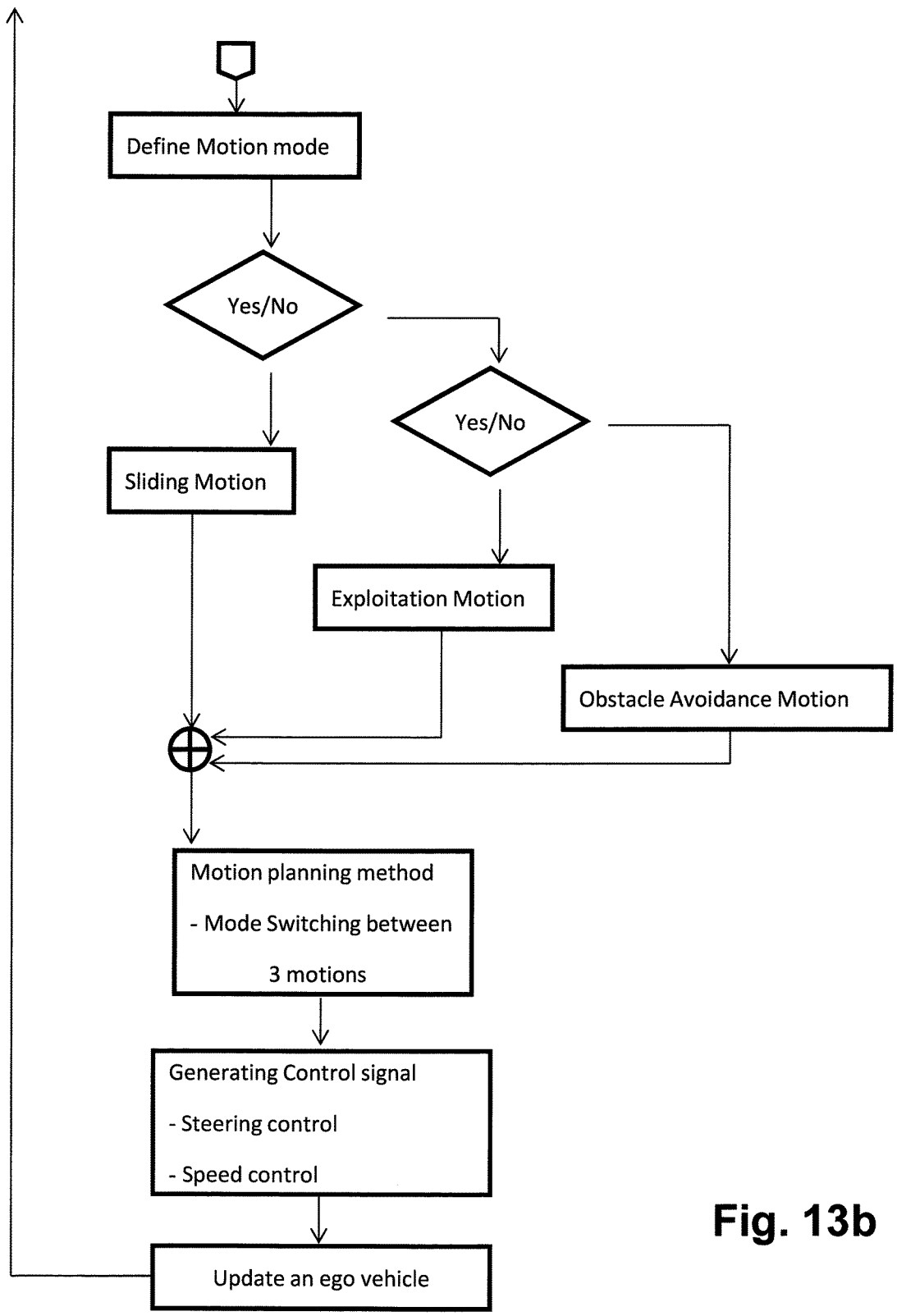

FIG. 13a, b show together a flow diagram the online navigation based on sliding motion. In a first step sensor information, e.g. of one or more sensors of a vehicle is obtained, like the current position of an ego vehicle and a list of detected obstacles. In a second step a mission goal is defined. In a third step the destination is checked whether the destination has been reached or not. If yes, then the method is terminated. If the destination has not been reached then in a forth step the vehicle status is checked in the regard if the vehicle is either in a guard area, or in a free space area or in an obstacle area. Only one of said three possibilities is determined, i.e. the motion mode is defined: First it is checked if the vehicle is in the guard area. If yes then "Sliding Motion"-Planning is used. If not, then it is checked whether the vehicle is located in the free space. If no, then "Obstacle Avoidance" motion planning is used. Otherwise if yes, then motion planning based on "exploitation motion" is used. This motion mode changes/switches depending on the current status of the vehicle. One of the three mentioned motion planning method is used and the motion planning method switches when the vehicle status changes.

In a sixth step a control signal may be generated for steering control and/or speed control. In a seventh step the status of the ego vehicle is updated and it is again proceeded with or repeated from the first step.

In a further embodiment an example for an implementation of the method is given in a high-level pseudo-code.

In the following a Boolean function is shown providing the output "true" if a first object/node is within the guard area of another object, its borders having a radius of D-epsilon and D+epsilon an with the object being in the center.

```
function b=guard_area (n,O, D,epsilon) is
Input
    O: list of obstacles
    n: Current node/state/position
    D: obstacle avoidance radius
    epsilon: guard area size
output
    b: true or false depending if the node n is within the guard area of
    any object
for o in O
    if distance(o,n)<D+epsilon or distance(o,n)>=D-epsilon
        then return True
end for
return False
```

In the following a Boolean function is shown providing the output "true" if a first object/node is within the obstacle avoidance area of another object, which is defined being the area being a circle with a radius D-epsilon:

```
function b=obstacle_avoidance_area (n,O,D,epsilon) is
Input
    O: list of obstacles
    n: Current node/state/position
    D: obstacle avoidance radius
    epsilon: guard area size
output
    b: true or false depending if the node n is within the guard area of
    any object
for o in O
    if distance(o,n)<D-epsilon
        then return True
end for
return False
```

In the following a Boolean function is shown providing the output "true" if a first object/node is outside the guard area of an object, i.e. has a distance to said object being larger than D+epsilon:

```
function b=free_space_area (n,O,D,epsilon) is
Input
    O: list of obstacles
    n: Current node/state/position
```

```
D: obstacle avoidance radius
epsilon: guard area size
output
b: true or false depending if the node n is within the guard area of
any object
b=False
for o in O
        if distance(o,n)>D+epsilon
            then b=True
    end for
    return b
```

The above mentioned distance function computes the distance of the two solutions and can take into consideration the space distance, the time distance or any other distance in the solution state.

In the following two types of a use of the method are shown in pseudo code.

find_solution_by_navigation:
This pseudo code shows how to find a solution by iteratively explore the space by always move from the previous node. This procedure generates one single path.

find_solution_by_search:
This pseudocode shows the general search method that explores the space on multiple direction and build a tree of nodes, out of it only one path is provided as solution.

The two types of said method according to said embodiment use the following functions that generate either one node or multiple nodes from the current exploring node:

generate_obstacle_avoidance_node/s:
This pseudocode moves the node towards an evading manoeuvre and generates nodes that do not collide with the obstacles.

generate_sliding_node/s:
This pseudocode generates a node or more nodes that move along the tangent space as defined above. When a node is entering the movement is more influenced by the tangent movement, while when the node is exiting, the movement is more directed towards the destination.

generate_exploitation_node/s:
This is the free space exploration that tries to move directly to the destination or to generate alternative exploring nodes.

```
function P=find_solution_by_search (s,d,O,D,epsilon,R) is
Input
O: list of obstacles
d: destination
s: origin node
D: obstacle avoidance radius
R: some radius to detect destination
epsilon: guard area size
output
P: path from the source n to the destination d
Q={ } : queue that stores visited nodes
Q<-s
n<-s;
While Q is not empty or distance(n ,d)<R
        n<-extract(Q)
        if obstacle_avoidance_area (n,O,D,epsilon)
            then Q<-generate_obstacle_avoidance_nodes(n,d,O,D,epsilon)
        else if guard_area (n,O,D,epsilon)
            then Q<-generate_sliding_nodes(n,d,O,D,epsilon)
        else : node in the free area
            then Q<-generate_exploitation_nodes(n,d,O,D,epsilon)
        update_cost(n)
end while
return generate_path(n)
``` where "generate_path(n)" starts from n and navigates back to build the final path. "update_cost(n)" updates the cost of the currently explored node, possibly also updating its predecessor. The term cost is to be understood in terms of the resources for the nodes to be used.

```
function P=find_solution_by_navigation (s,d,O,D,epsilon,R) is
Input
O: list of obstacles
d: destination
s: origin node
D: obstacle avoidance radius
R: some radius to detect destination
epsilon: guard area size
output
P: path from the source n to the destination d
n<-s;
While distance(n ,d)<R
        if obstacle_avoidance_area (n,O,D,epsilon)
            then n<-generate_obstacle_avoidance_node(n,d,O,D,epsilon)
        else if guard_area (n,O,D,epsilon)
            then n<-generate_sliding_node(n,d,O,D,epsilon)
        else : node in the free area
            then n<-generate_exploitation_node(n,d,O,D,epsilon)
end while
return generate_path(n)
```

In an even further embodiment the present invention provides a method for computing a smooth motion planning for autonomous driving with time-dependent obstacles, comprising the steps of 1) Execute a sampling-based exploration step
2) For every exploitation step, generate a movement towards the target, which avoids obstacle
3) Stop if solution meets smoothness requirements or continue with first step.

At least one embodiment may have at least one of the following advantages:

a faster computing speed, thus saving computational resources more reliable computation of trajectories smoothness of the trajectory for vehicle motion, thus saving vehicle resources and/or enhancing passenger comfort At least one embodiment of the present invention may enable or provide at least one of 1)-5):

1) A discrete sampling based method (RRT family), with lower computational cost in terms of iteration in exploration mode, with exploration and exploitation steps, where the exploitation steps seek for a direct solution which avoid obstacles and exploration steps that favor obstacle avoidance.

2) A method for sample-based motion planning where the motion step is defined by the guard function (both for exploration and exploitation)

3) A Hybrid Automata method that defines a (or multiple) switching (guard) function (s), which splits the motion space into at least 3 areas, each associated a motion planning strategy:

a. Guard area: the vehicle follows a Sliding motion path b. Obstacle area: the vehicle only follows Obstacle Avoidance path (Exploration)

c. Free area: the vehicle follows Tracking Goal path (Exploitation)

4) Generating a Sliding motion in the Guard area to meet the driving comfort criteria; the maximum Acceleration, the maximum Deceleration and Yaw rate range constraint, based on using a Guard function and a Guard area. The method includes these following Sliding motion behaviors.
  a. Sliding-in condition: when the motion enters the guard area
  b. Sliding condition: when the motion happens inside the guard area
  c. Sliding-out condition: when the motion exits the guard area
5) A Sliding motion vector is made of:
  a. The tangent component of gradient vector
  b. The orthogonal component of gradient vector.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for motion planning for autonomous moving objects (AMO), the method comprising:
  computing, by a computing device, a time-dependent trajectory of an AMO to a destination;
  determining a motion planning computation procedure from a plurality of motion planning computation procedures to use for updating the time-dependent trajectory of the AMO to the destination, wherein determining the motion planning computation procedure comprises:
    based on received sensor information indicating detection of an obstacle on the time-dependent trajectory, comparing a position of the AMO with a guard area (GA) surrounding the obstacle, wherein a border of the GA is a certain distance away from the obstacle;
    based on the received sensor information indicating detection of the obstacle and the position of the AMO being outside of the border of the GA, selecting a first motion planning computation procedure from the plurality of motion planning procedures; and
    based on the received sensor information indicating detection of the obstacle and the position of the AMO being within the border of the GA, selecting a second motion planning computation procedure from the plurality of motion planning procedures; and
  updating the time-dependent trajectory of the AMO based on using the determined motion planning computation procedure.

2. The method according to claim 1, wherein the plurality of motion planning procedures comprises a third motion planning computation procedure, the first motion planning computation procedure, and the second motion planning computation procedure, wherein the third motion planning computation procedure is based on a principle of Tracking Goal, wherein the first motion planning computation procedure is based on a principle of Sliding Motion, and wherein the second motion planning computation is based on a principle of Obstacle Avoidance.

3. The method according to claim 2, wherein the third motion planning computation procedure is based on the principle of Tracking Goal by utilizing a potential function to determine an update to the time-dependent trajectory of the AMO that will minimize the travel time to the destination.

4. The method according to claim 3, wherein the first motion planning computation procedure is based on the principle of Sliding Motion by utilizing a sliding motion vector to update the time-dependent trajectory of the AMO, wherein the sliding motion vector includes a tangent component of a gradient vector and an orthogonal component of the gradient vector, wherein the gradient vector is a vector pointing directly from the AMO to the destination.

5. The method according to claim 1, wherein the method further comprises:
  determining the GA of the obstacle based on a yaw rate of the AMO and a distance from the position of the AMO to the detected obstacle.

6. The method according to claim 1, wherein the updating the time-dependent trajectory based on the first motion planning computation procedure comprises updating the time-dependent trajectory such that the trajectory enters, lies within, and exits the GA.

7. The method according to claim 1, wherein the received sensor information indicates detection of a plurality of obstacles, and wherein the method further comprises:
  defining a plurality of GAs for the plurality of obstacles, wherein determining the motion planning computation procedure to use for updating the time-dependent trajectory of the AMO to the destination is based on at least two of the plurality of GAs, wherein the at least two of the plurality of GAs are associated with different computational boundaries defined by physical parameters.

8. The method according to claim 1, wherein a size of the GA of the obstacle is selected such that a certain smoothness of the trajectory is provided when computing the trajectory.

9. The method according to claim 1, wherein the GA has a shape of a sphere, an ellipsoid, and/or a hyper polygon.

10. The method according to claim 4, wherein the second motion planning computation procedure is based on the principle of Obstacle Avoidance by utilizing single-path exploration and/or using sample-based exploration with an underlying exploration tree in order to determine an update to the time-dependent trajectory of the AMO.

11. The method according to claim 1, further comprising:
  receiving the sensor information from one or more sensors; and
  determining whether the obstacle has been detected based on the sensor information, wherein the obstacle is determined to be detected when a point on the computed time-dependent trajectory lies within or touches the GA surrounding the obstacle, and wherein selecting the second motion planning computation procedure is based on the point on the computed-time dependent trajectory lying within or touching the GA surrounding the obstacle.

12. The method according to claim 1, wherein computing the time-dependent trajectory of the AMO to the destination is based on using at least one of the plurality of motion planning computation procedures.

13. The method according to claim 1, wherein determining the motion planning computation procedure from the plurality of motion planning computation procedures further comprises:
based on the received sensor information indicating no obstacle or threat has been detected, selecting a third motion planning computation procedure from the plurality of motion planning procedures, wherein the third motion planning computation procedure is based on a principle of Tracking Goal.

14. The method according to claim 13, wherein the third motion planning computation procedure is based on using a line of sight of the AMO.

15. The method according to claim 1, wherein the second motion planning computation procedure is based on a principle of Obstacle Avoidance, and wherein the second motion planning computation procedure comprises expanding an underlying exploration tree to determine one or more feasible trajectories to avoid the obstacle.

16. A motion planning device for motion planning for autonomous moving objects (AMO), the motion planning device being configured to:
compute a time-dependent trajectory of an AMO to a destination;
determine a motion planning computation procedure from a plurality of motion planning computation procedures to use for updating the time-dependent trajectory of the AMO to the destination, wherein determining the motion planning computation procedure comprises:
based on received sensor information indicating detection of an obstacle on the time-dependent trajectory, comparing a position of the AMO with a guard area (GA) surrounding the obstacle, wherein a border of the GA is a certain distance away from the obstacle;
based on the received sensor information indicating detection of the obstacle and the position of the AMO being outside of the border of the GA, selecting a first motion planning computation procedure from the plurality of motion planning procedures; and
based on the received sensor information indicating detection of the obstacle and the position of the AMO being within the border of the GA, selecting a second motion planning computation procedure from the plurality of motion planning procedures; and
update the time-dependent trajectory of the AMO based on using the determined motion planning computation procedure.

17. The device according to claim 16, wherein the device is adapted to convert the computed or updated time-dependent trajectory into steering information and speed information for the AMO.

18. The device according to claim 16, wherein the device is connected to one or more sensors of the AMO for obstacle detection, position, and orientation determination.

19. The device according to claim 16, wherein the device is connected to a database providing map information.

20. A non-transitory computer readable medium storing a program that, when executed, causes a computer to execute a method for motion planning for autonomous moving objects (AMO), the method comprising:
computing a time-dependent trajectory of an AMO to a destination;
determining a motion planning computation procedure from a plurality of motion planning computation procedures to use for updating the time-dependent trajectory of the AMO to the destination, wherein determining the motion planning computation procedure comprises:
based on received sensor information indicating detection of an obstacle on the time-dependent trajectory, comparing a position of the AMO with a guard area (GA) surrounding the obstacle, wherein a border of the GA is a certain distance away from the obstacle;
based on the received sensor information indicating detection of the obstacle and the position of the AMO being outside of the border of the GA, selecting a first motion planning computation procedure from the plurality of motion planning procedures; and
based on the received sensor information indicating detection of the obstacle and the position of the AMO being within the border of the GA, selecting a second motion planning computation procedure from the plurality of motion planning procedures; and
updating the time-dependent trajectory of the AMO based on using the determined motion planning computation procedure.

* * * * *